CALCULATING MACHINE USING PULSE ACTUATED COUNTERS

Filed May 1, 1962 2 Sheets-Sheet 1

United States Patent Office 3,353,008
Patented Nov. 14, 1967

3,353,008

CALCULATING MACHINE USING PULSE ACTUATED COUNTERS

Norbert Kitz, John George Lloyd, and Hugh Lyon Mansford, London, England, assignors to Bell Punch Company Limited, London, England, a British company Filed May 1, 1962, Ser. No. 192,042
Claims priority, application Great Britain, May 1, 1961, 15,669/61
7 Claims. (Cl. 235—160)

Figure 1:
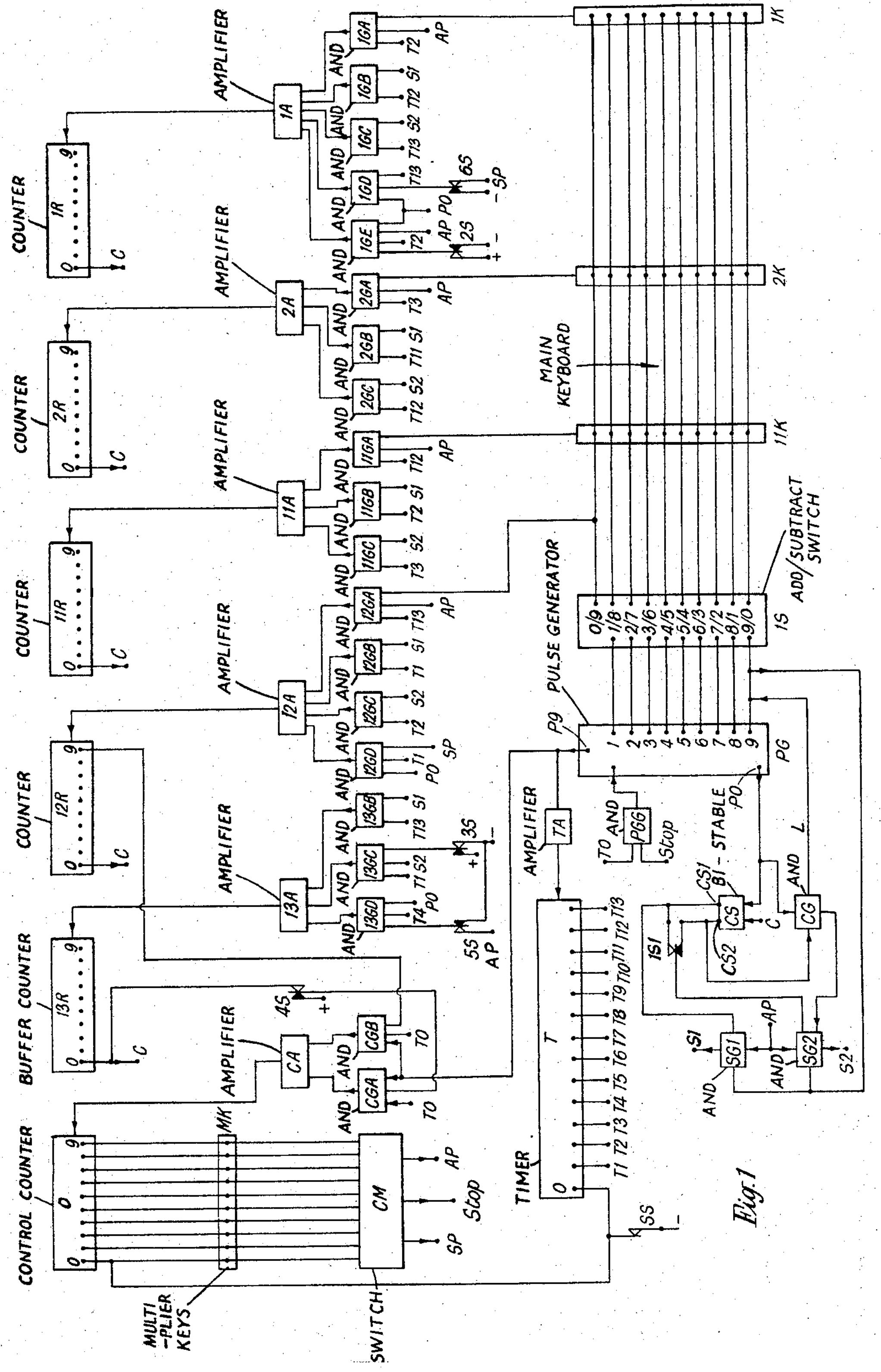

This invention relates to calculating machines and more particularly to readily portable office desk electronically operated calculating machines of the kind which include a series of counting devices and a carry store operative to apply a carry pulse to any of said counting devices if the content of the next lower counting device in the series passes to zero from the maximum number that it is capable of registering.

A calculating machine of the kind referred to above previously proposed by the applicants and suitable for performing multiplication comprises a plurality of orders of keys, one counting device being uniquely associated with each order of keys, an electrical pulse generator, a series of multiplier keys, means operable during a cycle of operation of the machine for causing the pulse generator to transmit a number of electrical pulses corresponding to the value of any actuated key in said orders of keys to the counting device associated with the actuated key, means for initiating a number of cycles of operation of the machine equal to the value of an actuated multiplier key and means operable to shift the number registered by each counting device into the next counting device in the series.

It is an object of the invention to simplify a calculating machine of the kind referred to in the preceding paragraph.

The invention consists in that the the same carry store which is operative to apply a carry pulse to any of the counting devices when the content of the next lower counting device passes to zero is also used during a shift operation to control the means for shifting the number registered by each counting device into the next counting device in the series.

The calculating machine previously proposed by the applicants is also suitable for performing division and a part of the division process consists in shifting the complement of the number registered by each counting device into the next counting device in the series. Accordingly the present invention also contemplates using the same carry store for controlling the shifting means during complementary shift as during the normal shift referred to above.

The invention is particularly applicable to calculating machines which include means for establishing electrical paths between the pulse generator and the counting devices for successive periods of time. In this case the carry store is preferably a two-state device which is set when the content of any one of the counting devices passes to zero and is unset at or near the beginning of each of the periods during which said electrical paths are established. In this case a carry pulse is applied to any counting device if the carry store is changed back from the set state to the unset state during the period for which the electrical path to that counting device is established. The carry pulse may, for example, be a pulse from the pulse generator which is passed through a carry gate circuit which is opened when the carry store changes from the set state to the unset state.

According to one embodiment of the invention the shifting means includes a first shift gate circuit which is open when the carry store is unset and a second shift gate circuit which is open when the carry store is set. The arrangement is such that during a shift operation the pulse generator is coupled through the first shift gate circuit to each counting device in succession and through the second shift gate circuit to each respective next higher counting device in the series. Thus pulses from a group of pulses are applied to a counting device until the carry store is set by that counting device passing to zero, whereafter the remainder of that group of pulses is applied to the next higher counting device. The arrangement is modified during a shift and complementing operation so that the pulse generator is coupled through the first shift gate circuit to each counting device in succession together with the respective next higher counting device in the series. Thus, pulses from a group of pulses are applied to each pair of counting devices in succession until, and only until, the carry store is set by the lower counting device of that pair passing to zero.

When the counting devices are decimal devices, each group of pulses preferably consists of nine pulses and a tenth pulse is provided by connecting the output of the carry gate to the inputs of the shift gates. In this case an additional pulse must be applied to the counting device which is connected to the output of the first shift gate circuit at the beginning of the shift operation to compensate for the lack of a carry pulse to this counting device from the next lower counting device. However, during the shifting and complementing operation a maximum of nine pulses is required at the output of the second shift gate circuit and accordingly means are provided for closing the second shift gate circuit for the duration of each carry pulse.

Figure 2:
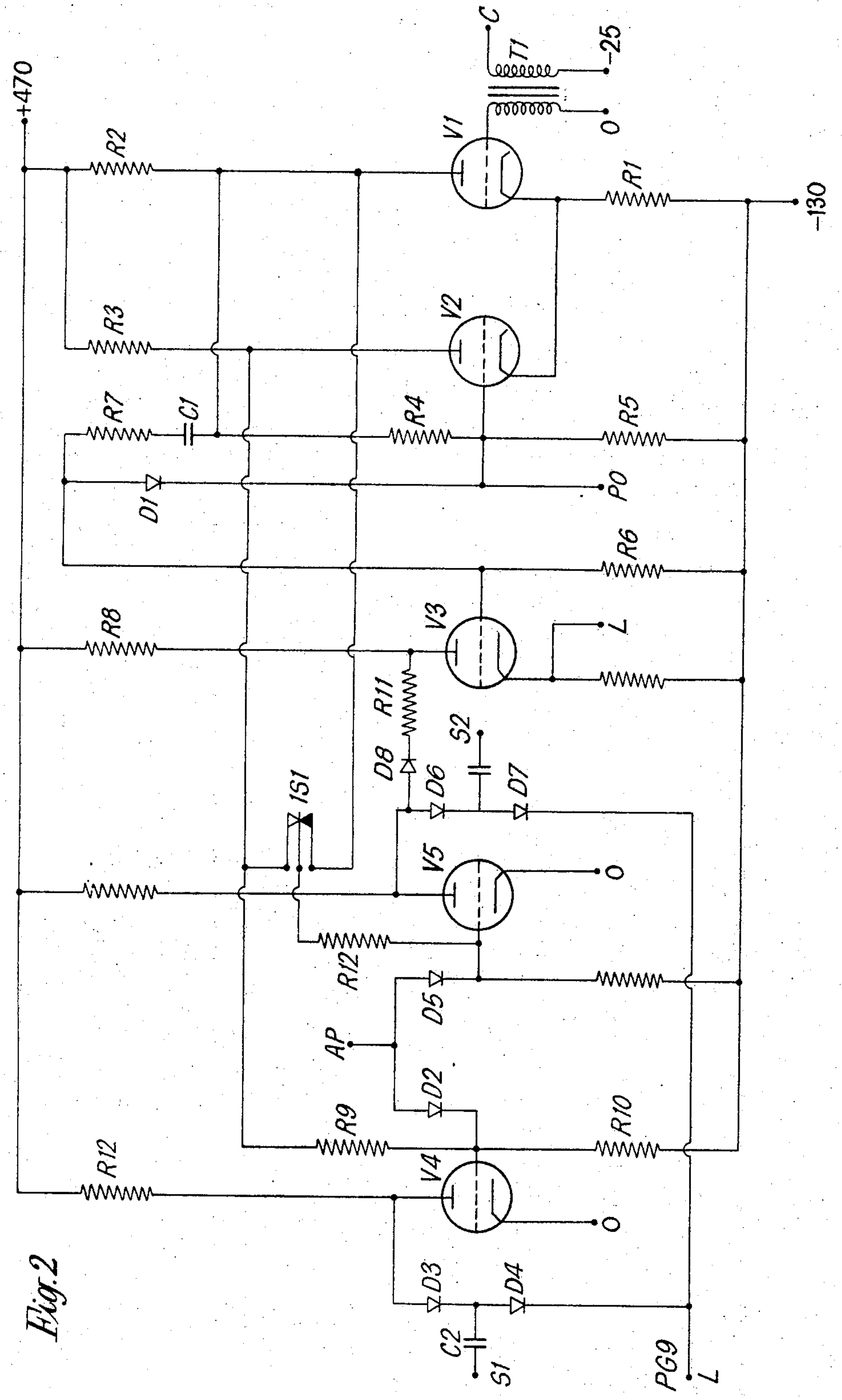

One method of performing the invention will now be described with reference to the accompanying drawings in which:

FIGURE 1 is a block diagram of the electrical circuit of a calculating machine according to the invention, and FIGURE 2 is a simplified circuit diagram of an arrangement according to the invention for inclusion in a calculating machine.

The calculating machine illustrated in FIGURE 1 includes eleven orders of keys, of which only the first two orders (1K and 2K) and the last order (11K) are shown in the drawing. The register of the machine comprises eleven counting devices associated with the eleven orders of keys and of these only the first two counting devices (1R and 2R) and the eleventh counting device (11R) are shown in the drawing. The register also includes a twelfth counting device 12R which is provided to receive carry pulses from the counting device 11R, but there is no order of keys associated with this counting device. It will be appreciated that there is no limit to the number of orders of keys and counting devices which can be employed in order to obtain any desired capacity for the machine, but it will normally be desirable to make the number of counting devices one greater than the number of orders of keys in order to accommodate carry-over from the counting device associated with the highest order of keys.

Each counting device has associated therewith an input amplifier and in the drawing there are illustrated amplifiers 1A and 2A for the first two counting devices 1R and 2R, and amplifiers 11A and 12A for the eleventh and twelfth counting devices 11R and 12R. The counting devices 3R to 10R (not illustrated) are respectively provided with input amplifiers 3A to 10A (also not illustrated). The counting devices will normally be in the form of the ring counters described and claimed in United States patent application No. 65,414, filed Oct. 27, 1960, now abandoned (corresponding to United Kingdom patent application No. 42,046 of 1959).

Each amplifier has a number of inputs connected to the outputs of a number of gate circuits or "AND" logical elements. Each amplifier includes means for decoupling its various inputs so that the output of any one gate does not interfere with the operation of the remaining gates associated with the same input amplifier. In the drawing gates 1GA, 1GB, 1GC, 1GD and 1GE are shown supplying the amplifier 1A; gates 2GA, 2GB, and 2GC are shown supplying the amplifier 2A; gates 11GA, 11GB and 11GC are shown supplying the amplifier 11A; and gates 12GA, 12GB, 12GC and 12GD are shown supplying the amplifier 12A. Each of the counting devices 3R to 10R (not shown) is provided with three gate circuits -GA, -GB and -GC (also not shown).

In addition to the twelve counting devices which constitute the register of the machine two further counting devices are provided. The first of these further counting devices, designated as 13R in the drawing, is a buffer counting device. This counting device is used, during shift or multiplication by ten, to store the digit registered in the counting device 12R until space is made for it in the counting device 1R. It is also used in division to count the number of subtraction cycles performed by the machine. The counting device 13R is provided with an input amplifier 13A and three gate circuits 13GB, 13GC and 13GD. The second of the two further counting devices is designated in the drawing as C and functions as a control device. The primary function of this control device is to count the number of addition cycles performed during multiplication and to control the changes between subtraction and complementary shift cycles during division. This control device is associated with a set of keys MK which are used to set the multiplier when the machine is being used for multiplication. The control device C is also provided with an input amplifier CA which is controlled by two gate circuits CGA and CGB. The inputs to the gate CGA are constituted by the P9 line, the output T0 of a timing device T and, when the switch 4S is closed, the output 13R0 of the counting device 13R. The switch 4S is open during addition and multiplication and closed during the subtraction and division. Thus, the third input to the gate CGA is ineffective during addition and multiplication so that one pulse is applied to the amplifier CA during multiplication whenever the output T0 is energised. This causes the control device to move one step forward for each complete cycle of the timing device. During division, however, the timing device is only stepped forward by a pulse through the gate CGA when the counting device 13R registers 0. The inputs to the gate CGB are constituted by the P9 line, the output T0 of the timing device and the output 12R9 of the counting device 12R.

As in the case of the counting devices 1R to 12R the counting devices 13R and C may be ring counters as described in United States patent application No. 65,414, filed Oct. 27, 1960 (corresponding to United Kingdom patent application No. 42,046 of 1959).

The pulses required for operating the counting devices referred to above are produced by a pulse generator PG which is illustrated as having separate outputs numbered 1 to 9. During one cycle of the generator the output 1 produces one pulse, the output 2 produces two pulses and so on up to the output 9 which produces nine pulses. In addition the pulse generator has an output P0 which produces one pulse at the beginning of each cycle and an output P9 which produces one pulse at the end of each cycle. The outputs 1 to 9 from the pulse generator are applied to the various orders of keys through a changeover switch 1S. This switch is in a first position when the machine is being used for addition and multiplication and in a second position when the machine is being used for subtraction and division. In the first position of the switch 1S, output 1 is connected to the number one key in each order; output 2 is connected to the number two key in each order; and so on up to the output number 9 which is connected to the number nine key in each order. When the switch 1S is in the second position, output 1 of the pulse generator is connected to the number eight key in each order of keys; output 2 is connected to the number seven key in each order; and so on up to output 8 which is connected to the number one key in each order. Further, with the switch 1S in the second position, output 9 is connected to the GA gate circuit of each counting device associated with an order of keys in which no key is operated.

The output designated as P0 produces one pulse at the beginning of each cycle of the generator and the output designated as P9 produces one pulse at the end of each cycle of the generator.

To control the operation of the machine a timing device T is provided. This device has fourteen outputs which are designated T0 to T13. A switch SS is connected to the T0 output to ensure that at the start of a calculation the first pulse appears at T1 output. The timing device is provided with an input amplifier TA which is fed by one pulse from the pulse generator during each cycle of the pulse generator. Thus, during a calculation the timing device is moved forward one step for each cycle of the pulse generator and the output voltage moves forward sequentially from output T1 to T13 and thence back to T0.

The various outputs of the timing device are connected to the gate circuits as indicated by the references T0 to T13 shown at the inputs of the gates. Thus, for example, the output T2 is connected to one input of the gate 1GA, to one input of the gate 1GE, to one input of the gate 11GB and to one input of the gate 12GC. The output T0 is connected to one input of the gate CGA, to one input of the gate CGB, and to one input of a gate PGG the other input to which is constituted by a stop signal. The output of the gate PGG is applied to the pulse generator and serves to stop the generator during the first period of the timing device if the stop line is energised.

To ensure that the number registered in any counting device is increased by one each time the counting device of the next lower order passes through zero, a carry store CS is provided. This carry store is a two-state device which is set by a pulse transmitted thereto over a line C each time a counting device passes through zero. The two-state device is unset by a P0 pulse applied thereto at the beginning of each cycle of the pulse generator PG so that its output CS1 is energised. When the carry store is set the output CS2 is energised instead of the output CS1. The output CS2 is connected to one input of a carry gate CG in such a way that, if the carry store is changed from the set state to the unset state, a pulse is generated and is applied to the carry gate CG. The gate CG operates as an "AND" gate and its other input consists of the P0 pulses. The output L of the gate CG is mixed with the outputs from the pulse generator in such a way that a pulse occurring at the output of the gate CG is transmited to the GA gate of each order irrespective of whether there is a key operated in that order or not. Accordingly a carry pulse will be applied to any counting device during the period of the timing device when its GA gate is open, if the carry store has been set during the preceding period of the timing device. For example, a carry pulse will be applied to the counting device 2R during the period T3 if the carry store has been set during the period T2. When the machine is set for addition and subtraction the only counting device which can receive pulses, and hence the only counting device which can pass through zero, during the period T2 is the counting device 1R. Hence the counting device 2R can receive a carry pulse only from the counting device 1R and similarly each other counting device can only receive a carry pulse when the next lower counting device has passed through zero.

The components so far described would enable the machine to perform addition and subtraction, but when the machine is required to perform multiplication or division it is necessary for the timing device to carry out more than one cycle and, to control the number of cycles of operation of the timing device, the control device C is provided. The control device has ten outputs which are illustrated as C0 to C9. Each of these outputs is associated with a corresponding key in a bank of multiplier keys MK. Each multiplier key, when operated, selects the corresponding output of the control device and when no multiplier key is operated the output C0 is selected. The various outputs are supplied to a switching arrangement CM which enables the outputs to be correctly routed when the machine is being used for any of its four arithmetical operations. Thus, during multiplication the selected output is connected to the stop line so that the operation of the pulse generator is stopped when the timing device has performed the number of cycles corresponding to the operated key in the bank of multiplier keys. Other outputs of the switching arrangement include an AP line and an SP line. When the AP line is energised the machine operates to perform addition or subtraction and when the SP line is energised the machine operates to shift or multiply by ten.

In order to control the shift operation of the machine, two gates SG1 and SG2 are provided. The gate SG1 has an output S1 and the gate SG2 has an output S2. Nine pulses per cycle of the pulse generator are supplied to one input of each gate from the No. 9 output of the pulse generator together with an additional pulse P0 from the carry gate CG. A second input of each gate is constituted by the AP line. A third input of each gate is constituted by one of the two outputs CS1 and CS2 of the carry store CS. The output CS1 is energised when the carry store CS is unset and the output CS2 is energised when the carry store is set. A fourth input of the gate SG2 is constituted by an inverted output from the carry gate CG. Provided the AP line is not energised, nine pulses per cycle of the pulse generator are passed to the output S1 and/or the output S2. In addition, if the carry store CS has been set during the preceding period a P0 pulse is passed to the output S1. However, a P0 pulse cannot be passed to the output S2 because the gate SG2 is at this time closed by the inverted output from the carry gate CG. During multiplication the pulses are normally passed through the gate SG1 to the output S1 but when the line C is energised as a result of a carry appearing in any counting device, the carry store is set, so that the gate SG1 is closed and the gate SG2 is opened to allow pulses to be passed to the output S2 instead of to the output S1. During division the switch 1S1 is changed over and the pulses (except the P0 pulse) are normally passed through to both the outputs S1 and S2, but when the line C is energised the pulses are prevented from reaching either of these outputs.

Additional inputs to certain of the gate circuits are provided by the switches 2S to 6S. Each of these switches is in its normal position (black contact made) during addition and multiplication and is changed over (white contact made) during division. Further, during subtraction the switches 4S and 6S are in their normal positions and the switches 2S, 3S and 5S are changed over.

*Operation*

When the machine is set to perform addition, the output C0 of the control device is connected through the switching arrangement CM to the stop line and a positive potential is applied to the AP line. Before any keys are depressed, the switch SS is in the closed position so that the output of the timing device T is held at the output T0 and the output of the control device C is held at the output C0. Further the stop gate PGG is disabled when the switch SS is closed, so that the pulse generator PG will be running.

It will be assumed that the number 34 is to be added to the number 57. Before the start of the calculation all the counting devices will register zero. To insert 34 into the machine, the number three key is depressed in the order 2K and the number 4 key is depressed in the order 1K. It is assumed in the following description that the two keys have been depressed together so that the 3 and the 4 are both added into the register during the same cycle of operation of the timing device T. However, this is not the normal method of operating the machine, since the operator will normally depress one key and then the other. In this case the insertion of each digit into the register will occupy a separate cycle of operation of the timing device T. It is irrelevant whether the higher order or the lower order key is depressed first.

When either of the keys is depressed, the switch SS is opened. This does not cause the pulse generator to stop, even though the inputs T0 and Stop of the gate PGG are energised, because sufficient delay is provided in the operation of this gate to ensure that the next P9 pulse from the pulse generator is enabled to step the timing device from T0 to T1. This has no effect since, at this stage, there is no other input to any gate circuit to which the output T1 is connected. When the timing device steps from T1 to T2, two of the inputs of the gate 1GA are energised, since the AP line is energised by the output C0 from the control device. Since the number 4 key is depressed in the order of keys 1K, four pulses will be applied during each cycle of the pulse generator to the gate 1GA. During the period T2 these pulses pass through the gate 1GA to the input of the amplifier 1A and thence to the input of the counting device 1R. These four pulses serve to step the counting device 1R from 0 to 4. Similarly during the period T3 three pulses will be applied through the gate 2GA to the amplifier 2A and thence to the counting device 2R. During the periods T4 to T13 nothing further will happen, since none of the gates will have all its inputs energised. During the following period T0 both the inputs of the gate PGG will be energised, since the stop line is connected to the output C0 of the control device through the switching arrangement CM and since the contacts SS are open. Accordingly the pulse generator will be stopped and this stage of the calculation is completed. As soon as the keys 3 and 4 in the orders 2K and 1K are released by the operator, the contacts SS will close again and the gate PGG will be disabled so that the pulse generator will restart.

To perform the second stage of the calculation, the number 5 key in the order 2K is depressed and the number 7 key in the order 1K is depressed. Again the switch SS is opened by the operation of either of these keys and the timing device T is allowed to step forward to T1 when it receives a P9 pulse through the amplifier TA from the pulse generator PG. Again nothing happens during period T1, but during period T2 seven pulses are passed through the gate 1GA to the amplifier 1A and thence to the input of the counting device 1R. Accordingly the counting device steps from 4 to 9 and thence to 0 and 1. When the counting device 1R registers 0, a pulse is applied to the input of the carry store CS over the common carry line C. This pulse sets the carry store, which is unset again by the next following P0 pulse. This next P0 pulse occurs during the period T3 and therefore a carry pulse is applied through the gate 2GA and the amplifier 2A to the input of the counting device 2R so that this counting device steps from 3 to 4. During the remainder of the period T3 five more pulses are passed through the gate 2GA to the amplifier 2A and thence to the input of the counting device 2R so that this counting device steps from 4 to 9.

During the periods T4 to T13 none of the gate circuits opened, but during the following period T0 both the inputs of the gate PGG are energised and the pulse generator PG is stopped. When the keys 5 and 7 in the orders 2K and 1K are released, the switch SS is closed and the pulse generator restarts. The register of the machine now reads 000000000091 which is result of the addition of 34 to 57.

When the machine is to be used for subtraction, the switch 1S is changed over so that, when a key in any order of keys is depressed, the corresponding GA gate input is supplied with a number of pulses equal to the nines complement of the value of the depressed key.

As an example the subtraction of 17 from 34 will be described.

Initially the number 34 is entered into the machine with the switch 1S set for addition in the same manner as in the example described above. The switch 1S is then changed over to subtraction and the number 17 is inserted in the orders 2K and 1K. Once again it will be assumed that the two keys are depressed together, but it is to be understood that normally the operator will first depress the number one key in the order 2K and then the number seven key in the order 1K, or vice versa.

Setting the switch 1S to subtraction has the effect of changing over the switch 2S so that its white contact is made and the negative potential is removed from the fourth input to the gate 1GE. Consequently during the period T2 the gate 1GE is opened when the pulse appears on the P0 line. As a result one pulse is fed into the counting device 1R so that it steps from 4 to 5.

Also during the period T2 two (9—7) further pulses are added into the counting device 1R so that it steps from 5 to 7. During the period T3 eight (9—1) pulses are added into the counting device 2R so that it steps from 3 to 1. As it steps to zero, it energises the carry line C and thus sets the carry store CS. At the beginning of the period T4 the P0 pulse unsets the carry store and a pulse is applied through the gate CG to the input of the counting device 3R (not shown) so that this counting device steps from 0 to 1. During the remainder of the period T4 a further nine pulses are applied to the counting device 3R so that this counting device is stepped from 1 to 0. As this counting device reaches 0, it sets the carry store CS so that at the beginning of the period T5 a carry pulse is applied to the counting device of the next higher order which is subsequently stepped to 0 by nine further pulses from the pulse generator. This process continues until the counting device 11R has been stepped from 0 to 1 by a carry pulse and thence back to 0 by the nine further pulses through the unoperated keys of the order 11K. As a result of the return of the counting device 11R to 0 a carry pulse is fed into the counting device 12R at the beginning of the period T13 and this counting device is subsequently stepped by nine pulses applied directly to one input of the gate 12GA from the 0/9 output of the switch 1S. Thus, the register of the machine now reads 000000000017, which is the result of subtracting 17 from 34.

When the machine is to be used for multiplication, the switch 1S is in the same position as for addition, but contacts in the switching arrangement CM are changed over so that the stop line, instead of being connected directly to the output C0 of the control device C, is connected to whichever of the outputs of the control device is selected by the depression of a key in the bank of multiplier keys MK. On the other hand the line SP which constitutes one of the inputs of the gate 12GD is connected to the output C0 so that the gate 12GD can only open when the control device is at C0. In addition the fixed positive potential is removed from the line AP which is now connected to all of the outputs C1 to C9 of the control device C. During multiplication the switches 2S, 3S, 4S, 5S and 6S are all in their normal positions (black contacts made) so that the gate circuits 1GD, 1GE and 13GD are prevented from opening, whereas the gate circuits 13GC and CGA are allowed to open when their other inputs are energised. In addition to performing the various switching operations described above, setting the machine for multiplication converts it from a key-responsive machine to a key-set machine. In other words, when a key in any of the orders of keys 1K to 11K is depressed, it will remain down until the calculation is completed. Finally, setting the machine to multiplication places the contact SS under the control of the multiplier keys in the bank MK instead of the keys in the orders 1K to 11K. Thus, when the machine is set for multiplication, the contact SS is opened when any one of the multiplier keys is depressed.

As an example the multiplication of 34 by 17 will be described.

Initially the multiplicand 34 is set on the keys of the machine by the depression of the number three key in the order 2K and the number four key in the order 1K. The orders 2K and 1K are only given by way of example, since the multiplicand could be set on any two consecutive orders of keys. However, it will normally be set in the lowest possible orders since, if it is set in too far up the machine, the first one or more digits of the answer may be lost. The two keys will lock down as the machine is set for multiplication, but the machine will not start to operate since these keys no longer control the contact SS. The first digit of the multiplier 17 is now entered into the multiplier keys by the depression of key 1 in the bank MK. This key locks down and opens the contact SS. The next P9 pulse from the pulse generator causes the timing device to step from T0 to T1, but it is unable to step the control device from C0 to C1 since a delay circuit is provided which prevents the gate circuit CGA from opening until the contact SS has been open for at least one period of the timing device. As the output C0 of the control device is still energised, the line AP is not energised, but the P0 pulse occurring during the period T1 is passed through the gate 12GD. In addition, during the same period nine further pulses are applied from the pulse generator through the gate circuit SG1 over the line S1 to one input of the gate 12GB, to the other input of which the output T1 is applied. As a result ten pulses are applied through the amplifier 12A to the input of the counting device 12R which accordingly steps from 0 to 0. When the counting device 12R steps from 9 to 0, the line C is energised and the carry store CS is set. As a result the input from the gate circuit SG1 is closed and the gate circuit SG2 is opened. However, no further pulses are received by the gate circuit SG2 from the pulse generator during the period T1 and accordingly no pulses are passed through the output S2. It is to be noted that, if the number registered in the counting device 12R had been other than 0, a corresponding number of pulses would have been applied during the period T1 from the output S2 through the gate circuit 13GC to the counting device 13R. At the beginning of the period T2 the P0 pulse unsets the carry store CS with the result that the gates CG and SG1 are opened and the gate SG2 is closed. As a result this P0 pulse passes through the gates CG and SG1 to one input of the gate 11GB, to the other input of which the output T2 is applied. Accordingly the P0 pulse is applied to the amplifier 11A and steps the counting device 11R from 0 to 1. Also during the period T2 nine further pulses are applied from the line S1 through the gate 11GB and the amplifier 11A to the counting device 11R which is stepped from 1 to 0. Again the carry store CS is set as the counting device 11R steps from 9 to 0 and as a result the next P0 pulse is applied to the counting device 10R (not shown) at the beginning of the period T3.

It is to be noted that no pulses are passed through the gate 1GA during the period T2 since the AP line is de-energised.

During the remainder of the period T3 nine further pulses are applied from S1 to the counting device 10R (not illustrated). The carry store is again set and thus ten pulses are applied to the counting device 9R (not illustrated) during the period T4. During the period T5 ten pulses are applied to the counting device 8R (not illustrated) and the operation of the machine continues in the same manner until at the end of the period T13 each of the counting devices 13R to 1R registers 0.

During the next period T0 one input of the gate circuit PGG is energised but the stop line is not energised and accordingly the pulse generator PG continues to run. At the end of this period T0 a pulse is applied from the output P9 of the pulse generator through the gate circuit CGA to the amplifier CA and thence to the input of the control device C. The gate CGA is allowed to open since the switch 4S is in its normal position during multiplication. Accordingly the control device is stepped from C0 to C1. This causes the SP line to be energised and the AP line to be energised, with the result that both gates SG1 and SG2 are closed. No counting device steps from 9 to 0 during this period and accordingly the carry store CS remains unset.

During the period T1 nothing happens since the other inputs of the gate circuits 12GB, 12GD and 13GC are not energised at this time.

During the period T2 four pulses are supplied from the generator PG through the depressed number 4 key in the order 1K and thence through the gate circuit 1GA and the amplifier 1A to the input of the counting device 1R. As a result the counting device 1R is stepped from 0 to 4. Similarly, during the period T3 three pulses are fed into the counting device 2R which is stepped from 0 to 3. Nothing further happens during the periods T4 to T13, but during the next period T0 both inputs to the gate circuit PGG are energised since the stop circuit is connected through the depressed number 1 key in the bank MK to the energised output C1 of the control device. Accordingly the pulse generator is stopped and the first part of the calculation is completed. When the pulse generator stops, the depressed number 1 key in the bank MK is automatically released and the switch SS is reclosed so that the timing device returns to T0 and the control device returns to C0.

Key number 7 in the bank of multiplier keys is now depressed and a shift operation similar to that described above commences while the control device is at C0. The operations performed by the machine during the periods T1 to T10 are precisely the same as those which occurred at the commencement of the calculation. However, during the period T11 the seventh pulse from the pulse generator causes the counting device 2R to pass from 9 to 0. Accordingly the carry store CS is set and as a result the gate circuit SG1 is closed and the gate circuit SG2 is opened. Thus the remaining three pulses from the pulse generator occurring during the period T11 are which occur during the period T12 are passed through the S2 line, the gate 2GC and the amplifier 2A to the input of the counting device 2R. Accordingly the counting device 2R is stepped from 0 to 4.

During the period T13 ten pulses are applied over the S1 line through the gate 13GB to the counting device 13R. As a result the counting device 13R is stepped from 0 to 0. When the counting device 13R reaches 0, the carry store is set, so that the gate circuit SG2 is opened. However, no further pulses are received by the gate circuit SG2 from the pulse generator during the period T13 and accordingly no pulses are passed through to the output S2. The machine therefore now registers 000000000340.

During the next period T0 one input of the gate circuit PGG is energized but the stop circuit is not energised and accordingly the pulse generator PG continues to run. At the end of the period T0 the P9 pulse is applied from the pulse generator through the gate circuit CGA to the input of the control device C. Accordingly the control device is stepped from C0 to C1. This causes the SP line to be de-energised and the AP line to be energised.

During the period T1 nothing happens, but during the period T2 four pulses are supplied from the generator PG through the depressed number 4 key in the order 1K to the input of the counting device 1R. As a result the counting device 1R is stepped from 0 to 4. Similarly during the period T3 three pulses are fed into the counting device 2R which is stepped from 4 to 7. Nothing further happens during the period T4 to T13 but during the next period T0 the control device C is stepped from C1 to C2. The SP line is still de-energised and the AP line is still energised so that the machine performs another addition and the counting device 1R is stepped from 4 to 8 and the counting device 2R from 7 to 0. When the counting device 2R reaches 0, it sets the carry store so that the next P0 pulse is applied to the counting device 3R which is accordingly stepped from 3 to 4.

The machine continues to perform repeated addition while the control device is stepped up to C7. When the control device reaches C7, the stop line is energised and the pulse generator is stopped during the following period T0. The machine now registers 000000000578. The various steps in the calculation are shown in the following Table 1.

TABLE 1

| C | 13R | 12R | 11R | 4R | 3R | 2R | 1R | |
|---|---|---|---|---|---|---|---|---|
| 0 | 0 | 0 | 0 | 0 | 0 | 0 | 0 | 34 entered on keyboard, but not in register. |
| 0 | 0 | 0 | 0 | 0 | 0 | 0 | 0 | Multiplier key 1 depressed and machine starts. Shift, as C is at 0. |
| 1 | 0 | 0 | 0 | 0 | 0 | 3 | 4 | As C is not at 0, add 34. |
| 0 | 0 | 0 | 0 | 0 | 0 | 3 | 4 | At T0 machine stops and C returns to 0. |
| 0 | 0 | 0 | 0 | 0 | 3 | 4 | 0 | Multiplier key 7 depressed and machine starts. Shift as C is at 0. |
| 1 | 0 | 0 | 0 | 0 | 3 | 7 | 4 | As C is not at 0, add 34. |
| 2 | 0 | 0 | 0 | 0 | 4 | 0 | 8 | Do. |
| 3 | 0 | 0 | 0 | 0 | 4 | 4 | 2 | Add 34. |
| 4 | 0 | 0 | 0 | 0 | 4 | 7 | 6 | Add 34. |
| 5 | 0 | 0 | 0 | 0 | 5 | 1 | 0 | Add 34. |
| 6 | 0 | 0 | 0 | 0 | 5 | 4 | 4 | Add 34. |
| 7 | 0 | 0 | 0 | 0 | 5 | 7 | 8 | Add 34. |
| 0 | 0 | 0 | 0 | 0 | 5 | 7 | 8 | At T0 machine stops and C returns to 0. |

passed to the output S2 instead of to the output S1. The inputs to a gate circuit 3GC (not shown) associated with the counting device 3R (not shown) are constituted by the S2 line and the output T11 from the timing device. Accordingly this gate is opened during the period T11 and the three pulses from the S2 line are applied to the counting device 3R. This counting device was previously registering 0 and accordingly it is now stepped to 3.

During the period T12 the carry store is as usual unset by the P0 pulse and the counting device 1R is stepped to 0 by the first six pulses (including the P0 pulse) from the pulse generator over the S1 line. When the counting device 1R passes from 9 to 0, the carry store is set so that the gate circuit SG1 is closed and the gate circuit SG2 is opened. Accordingly the remaining four pulses When the machine is to be used for division the switch 1S is in the same position as for substraction, but contacts in the switching arrangement CM are changed over so that the stop line is connected to the output C7 of the control device C, so that the line SP is connected to the outputs C1, C3, C5, C7 and C9 of the control device and so that the line AP is connected to the outputs C0, C2, C4, C6 and C8 of the control device. During division the switches 2S, 3S, 4S, 5S and 6S are all changed over so that their white contacts are made. Accordingly the gate circuit 13GC is prevented from opening but the gate circuit 1GE is allowed to open when its other inputs are energised. Further the gate CGA is prevented from opening except when the counting device 13R is at 0, the gate circuit 13GD is prevented from opening except when the AP line is energised and the gate circuit 1GD is prevented from opening except when the S2 line is energised. As in the case of multiplication, setting the machine to division converts it from a key-responsive machine to a key-set machine, and places the contact SS under the control of the multiplier keys in the bank MK. Further, setting the machine for division affects the operation of the change-over switch 1S1, so that the outputs S1 and S2 are in parallel and are connected to the pulse generator so long as the AP line is not energised, and the carry store is not set, but are disconnected from the pulse generator when the carry store is set.

As an example, the division of 146 by 12 will be described.

Initially the machine is set for addition and the number 146 is entered into the highest orders of the machine by the depression of the key 1 in the order 11K, the key 4 in the order 10K and the key 6 in the order 9K. As a result the number 146 is registered in the counting devices 11R, 10R and 9R in the same manner as described above for addition. The machine is now set for division and the divisor 12 is entered into the keys of the orders 11K and 10K.

The 0 key in the bank MK is now depressed to open the contact SS. As a result the next P9 impulse from the pulse generator to the timing device steps the timing device from T0 to T1, but it is unable to step the control device C from C0 to C1, because of the delay circuit mentioned above in connection with multiplication. Since the control device C is at C0, the line AP is energised and accordingly nothing happens during the period T1.

During the period T2 the P0 pulse is fed through the gate 1GE to the counting device 1R and thereafter nine further pulses are added into the counting device 1R through the gate 1GA so that this counting device steps from 0 to 0. When the counting device 1R passes from 9 to 0, the carry store CS is set. At the beginning of the period T3 the carry store is unset so that the gate CG is opened and the P0 pulse is applied to the counting device 2R which accordingly steps from 0 to 1. During the remainder of the period T3 nine further pulses are added into the counting device 2R through the gate 2GA so that this counting device steps from 1 to 0. The carry store is thus set and the next P0 pulse is fed to the counting device 3R which is subsequently stepped to 0 and sets the carry store so that the next P0 pulse is fed to the counting device 4R. The process continues until the counting device 8R has been stepped round and back to 0. Moreover, during the period T4 a P0 pulse is applied through the gate 13GD to the counting device 13R which steps from 0 to 1. During the period T9 the carry store is set, and thus during the period T10 a P0 pulse and nine further pulses are added into the counting device 9R to step it from 6 to 6. As the counting device 9R passes from 9 to zero, it sets the carry store so that the next P0 pulse is applied to the counting device 10R which is stepped from 4 to 5. During the remainder of the period T11 seven (9–2) more pulses are applied to the counting device 10R which accordingly steps from 5 to 2. As the counting device 10R passes from 9 to 0, it sets the carry store so that the P0 pulse at the beginning of the period T12 steps the counting device 11R from 1 to 2. Thereafter eight (9−1) further pulses are applied to the counting device 11R which accordingly steps from 2 to 0. As the counting device 11R passes from 9 to zero, it sets the carry store so that during the period T13 ten pulses are applied through the gate 12GA to the counting device 12R which is accordingly stepped from 0 to 0. The register now reads 002600000000 and the counting device 13R registers 1. During the following period T0 the P9 pulse from the output of the pulse generator has no effect on the control device C since the gate CGA is disabled as a result of the fact that the control device 13R has been stepped from 0 to 1, and the gate CGB is disabled since the counting device 12R is not registering 9. Accordingly the machine performs a further subtraction operation similar to that just described. At the end of this operation the machine reads 990600000000. Further the counting device 13R registers 2.

When the counting device 12R reaches 9, all the inputs of the gate circuit CGB are energised on the occurrence of the P9 pulse during the period T0, and a pulse is applied to the input of the counting device C, stepping it from C0 to C1. As has been pointed out above, the output C1 is connected to the SP line and not to the AP line and accordingly the next operation is similar to the shift or multiplication by ten performed during multiplication. However, since the outputs S1 and S2 are now in parallel the machine operates to complement all the numbers registered in the machine at the same time as it shifts them. At the beginning of the period T1 the P0 pulse is applied to the counting device 12R through the gate 12GD. Consequently the counting device 12R steps from 9 to 0 and the carry store is set. As a result the gates SG1 and SG2 are closed so that no pulses are applied to the gate 12GB or to the gate 13GC. At the beginning of the period T2 the carry store is unset by the P0 pulse so that this pulse is applied through the gate CG to the gates SG1 and SG2. Accordingly this pulse is applied to the gate 11GB and steps the counting device 11R from 9 to 0. This pulse is not applied to the gate 12GC because the gate SG2 is inhibited by the inverted output from the carry gate CG, so that its counting device 12R remains at 0. When the counting device 11R steps from 9 to 0, the carry store is set and no further pulses are applied to the gate 11GB or to the gate 12GC. During the period T3 ten pulses are applied through the gate 10GB (not shown) to step the counting device 10R from 0 to 0. Nine of these pulses are also applied through the gate 11GC to step the counting device 11R from 0 to 9. During the period T4 pulses are applied through the gate 9GB to step the counting device 9R on from 6. When the counting device 9R reaches 0, the carry store is set and the outputs from S1 and S2 cease. Thus only four of the pulses occurring during the period T4 are effective at the output S1 and only three of these appear at the output S2. Thus three pulses are applied through the gate 10GC to the input of the counting device 10R which is stepped from 0 to 3. No pulse is applied during the period T4 from the output of the pulse generator to the counting device 13R since the AP line is not energised as the control device C is at C1.

During the period T5 ten pulses are applied to the counting device 8R and nine pulses are applied to the counting device 9R stepping the former to 0 and the latter to 9. During the period T6 ten pulses are applied to the counting device 7R and nine pulses are applied to the counting device 8R stepping the former to 0 and the latter to 9. Similar conditions apply during the periods T7 to T12 during which the counting devices 7R to 2R are stepped to 9 and the counting device 1R to 0. During the period T13 eight pulses are applied to the counting devices 13R and 1R stepping the former to 0 and the latter to 8. In this case the P0 pulse reaches the counting device 1R through the gate 1GD. The register now reads 093999999998 and the counting device 13R registers 0. During the next period T0 the control device C is stepped from C1 to C2, by means of a pulse applied through the gate CGA which opens when the P9 pulse from the pulse generator arrives, since the counting device 13R is at 0. As a result the line AP is energized and the line SP is de-energised. Consequently the machine again commences to perform repeated complementary addition in the manner described above. The results of this operation are shown in Table 2. It will be seen that the machine performs eight complementary addition operations at the end of which the register reads 997999999998. The counting device 13R reads 8 and the control device C is stepped from 2 to 3 when the counting device 12R reaches 9. Thus the line SP is energised and the line AP is de-energised, with the result that the machine operates to shift and complement. As a result of this step the register reads 020000000012. The figures 1 and 2 in the counting devices 2R and 1R are the first two digits of the answer and the figure 2 in the counting device 11R is the remainder. The machine, however, repeats the process described above with the results shown in Table 2. The first four digits of the answer now appear in the counting devices 4R, 3R, 2R and 1R. If further digits are required, these counting devices can be cleared by means of a "CLEAR RIGHT" key and a further four digits may be produced in the same four counting devices by re-pressing the 0 key in the bank MK which will have been released when the control device was stepped to C7 at the end of the last shift and complement operation. Alternatively, since space is available in the counting devices 8R to 5R, the 0 key in the bank MK may be re-pressed without clearance of the counting devices 4R to 1R and in this case eight figures of the answer will appear in the counting devices 8R to 1R.

TABLE 2

| C | 13R | 12R | 11R | 10R | 9R | 4R | 3R | 2R | 1R | |
|---|---|---|---|---|---|---|---|---|---|---|
| 0 | 0 | 0 | 1 | 4 | 6 | 0 | 0 | 0 | 0 | 146 is added into the orders 11R, 10R, and 9R. Press DIVIDE key, enter 12 in keys of 11K and 10K and press 0 multiplier key. |
| 0 | 1 | 0 | 0 | 2 | 6 | 0 | 0 | 0 | 0 | 12 is subtracted from 14 in 11R and 10R. 12 R does not register 9, therefore C is not moved. Subtract again. |
| 1 | 2 | 9 | 9 | 0 | 6 | 0 | 0 | 0 | 0 | 12R registers 9. Therefore C is stepped to 1 and a shift operation initiated. |
| 2 | 0 | 0 | 9 | 3 | 9 | 9 | 9 | 9 | 8 | Note that the "tens" complement of the number in 13R is shifted into 1R. C is stepped to 2 at the end of the shift and further subtractions commence |
| 2 | 1 | 0 | 8 | 1 | 9 | 9 | 9 | 9 | 8 | 12R does not register 9. Therefore subtract again. |
| 2 | 2 | 0 | 6 | 9 | 9 | 9 | 9 | 9 | 8 | Do. |
| 2 | 3 | 0 | 5 | 7 | 9 | 9 | 9 | 9 | 8 | Do. |
| 2 | 4 | 0 | 4 | 5 | 9 | 9 | 9 | 9 | 8 | Do. |
| 2 | 5 | 0 | 3 | 3 | 9 | 9 | 9 | 9 | 8 | Do. |
| 2 | 6 | 0 | 2 | 1 | 9 | 9 | 9 | 9 | 8 | Do. |
| 2 | 7 | 0 | 0 | 9 | 9 | 9 | 9 | 9 | 8 | Do. |
| 3 | 8 | 9 | 9 | 7 | 9 | 9 | 9 | 9 | 8 | 12R registers 9. Therefore shift and complement. |
| 4 | 0 | 0 | 2 | 0 | 0 | 0 | 0 | 1 | 2 | C is stepped to 4. Therefore subtract. |
| 4 | 1 | 0 | 0 | 8 | 0 | 0 | 0 | 1 | 2 | 12R does not register 9. Therefore subtract again. |
| 5 | 2 | 9 | 9 | 6 | 0 | 0 | 0 | 1 | 2 | 12R registers 9. Therefore shift and complement. |
| 6 | 0 | 0 | 3 | 9 | 9 | 9 | 8 | 7 | 8 | C is stepped to 6. Therefore subtract. |
| 6 | 1 | 0 | 2 | 7 | 9 | 9 | 8 | 7 | 8 | 12R does not register 9. Therefore subtract again. |
| 6 | 2 | 0 | 1 | 5 | 9 | 9 | 8 | 7 | 8 | Do. |
| 6 | 3 | 0 | 0 | 3 | 9 | 9 | 8 | 7 | 8 | Do. |
| 7 | 4 | 9 | 9 | 1 | 9 | 9 | 8 | 7 | 8 | 12R registers 9. Therefore shift and complement. |
| 0 | 0 | 0 | 8 | 0 | 0 | 1 | 2 | 1 | 6 | Answer is in 4R, 3R, 2R and 1R. Remainder in 11R. |

Figure 2 is a simplified circuit diagram of the carry store CS, the carry gate CG, and the shift gates SG1 and SG2. The carry store CS consists of valves V1 and V2 and their associated components; the carry gate CG consists of a rectifier D1 a cathode follower V3 and associated components; the shift gate SG1 consists of a valve V4, rectifiers D2 to D4 and associated components and the shift gate SG2 consists of a valve V5, rectifiers D5 to D8 and associated components.

The carry store is basically a D.C. coupled bi-stable flip-flop circuit with the cathode of the two valves V1 and V2 connected through a common "long tail" resistor R1 to a potential of −130 volts. The anodes of the two valves are connected to a potential of +470 volts through individual resistors R2 and R3. In the unset state of the store, the grid of the valve V1 is held at a potential of 0 volt through the secondary winding of a transformer T1 to the primary winding of which is connected the carry line C, and the grid of the valve V2 is held at a positive potential by means of a potentiometer consisting of resistors R2, R4 and R5. Accordingly V2 is normally conducting, but when the carry line C is energised a positive pulse is applied to the grid of the valve V1 causing this valve to conduct. Consequently the potential of the grid of the valve V2 is lowered and the potential of its cathode is raised so that this valve ceases to conduct. The store is thus changed to its set state and remains in this state with the valve V1 conducting until a P0 pulse is applied to the grid of the valve V2. This pulse causes the valve V2 to conduct and the store returns to the normal unset state.

The grid of the cathode follower V3 is connected to a potential of −130 volts through a resistor R6 and in addition is connected to the P0 terminal through the rectifier D1 and to the anode of the valve V1 through a resistor R7 and a capacitor C1. The anode of the valve V3 is connected to a potential of +470 volts through a resistor R8 and the cathode is connected to the line L and through a resistor R9 to a potential of −130 volts. If a P0 pulse is applied to the diode D1 at a time when the anode potential of the valve V1 is increasing, the potential of the V3 grid is lifted and a pulse appears on the L line. It will be appreciated that the potential of the V1 anode rises when the valve V1 ceases to conduct, that is, when the store is changed from the set state to the unset state. Thus a pulse appears on the L line when a P0 pulse is applied to the grid of the valve V2, if, and only if, a carry pulse has previously been applied to the grid of the valve V1.

The shift gate SG1 consists essentially of an "AND" gate constituted by the rectifiers D3 and D4 and an "AND NOT" gate including the rectifier D2 and coupled to the "AND" gate by the valve V4. The potential of the grid of the valve V4 is determined by a potentiometer comprising resistors R3, R9 and R10 and by the potential on the AP line. When the AP line is energised the valve V4 is always conductive, but when the AP line is not energised the state of V4 depends on the state of the valve V2. If V2 is conducting, the grid potential of the valve V4 will drop below cut-off, but, if V2 is not conducting, the V4 grid potential will rise and V4 will conduct. So long as V4 is conducting, the "AND" gate is held closed, but when V4 ceases to conduct, current through the anode resistor R12 flows through the diodes D3 and D4. As a result pulses from the PG9 and L lines are able to pass through a capacitor C2 to the S1 line.

The shift gate SG2 is similar to the shift gate SG1 in that it includes an "AND" gate constituted by the rectifiers D6 and D7, and "AND NOT" gate including the rectifier D5, and a coupling valve V5. However, the "AND" gate includes an additional input from the anode of the valve V3 through a resistor R11 and the rectifier D8. This input prevents the "AND" gate from opening unless the valve V3 is non-conducting. This additional input prevents P0 pulses from being applied to the S2 line.

The switch 1S1 serves to change over the V5 grid connection through resistor R12 from the V1 anode to the V2 anode. When this switch is in the normal (black contact made) position (and provided the AP line is not energised), pulses from the PG9 and L lines are passed to the S1 line until the carry store is set, whereafter the remaining pulses before the next P0 pulses are applied to S2. When the switch is changed over (white contact made) pulses from the PG9 and L lines are passed to the S1 line and pulses from the PG9 line (but not the P0 pulse from the L line) are passed to S2 until the carry store is set, whereafter no more pulses are passed to either S1 or S2 until the next P0 pulse.

It is to be understood that the invention may be carried into effect by circuit means other than that illustrated in FIGURE 2. In particular the coupling valves V4 and V5 may be omitted, the shift gates SG1 and SG2 consisting solely of resistors and rectifiers arranged to give an output under the required conditions.

What we claim as our invention and desire to secure by Letters Patent of the United States is:

1. A calculating machine comprising a plurality of ordered pulse-operated counting devices, each counting device having minimum and maximum capacity counting states, an electronic pulse generator adapted to produce groups of pulses, means for applying pulses from successive ones of said groups of pulses to said counting devices successively in descending order, pulses from a single group being applied to a single counting device until such device passes from the maximum counting state to the minimum counting state, common carry storage means coupled to said counting devices and responsive to a change in any of said counting devices from said maximum capacity state to said minimum state for producing a carry indication, and means responsive to a carry indication produced by said carry storage means for applying the remainder of said single group of pulses to the next higher ordered counting device with respect to the device producing a carry indication.

2. A calculating machine comprising a plurality of ordered pulse-operated counting devices, each counting device having minimum and maximum capacity counting states, an electronic pulse generator adapted to produce groups of pulses, means for applying pulses from successive ones of said groups of pulses to successive pairs of adjacent counting devices in descending order, means for preventing the supplying of the first pulse of each said group of pulses to the higher order device of each associated pair of adjacent devices, pulses from any single group being applied to adjacent devices of a pair until the lower order one of said pair passes from the maximum counting state to the minimum counting state, carry storage means coupled to said counting devices and responsive to a change in state of any of said counting devices from said maximum capacity state to said minimum state for producing a carry indication, said means for applying pulses being responsive to said carry indication produced by carry storage means to cease applying pulses to a pair of adjacent counting devices upon production of a carry indication by the lower order one of said pair.

3. A calculating machine comprising a multiple order counting register, said register comprising a plurality of ordered counting devices, each counting device having minimum and maximum capacity counting states, said register further comprising carry storage means coupled to said counting devices and responsive to a change in any of said counting devices from said maximum capacity state to said minumum state for producing a carry indication, said calculating machine further comprising an electrical pulse signal generator, means for establishing electrical signal paths from said pulse generator to each of said counting devices for successive periods of time, means for controlling the number of electrical pulse signals passed from said pulse generator to each of said counting devices, means coupled to said pulse generator for supplying shifting signals to said counting devices in succession to transfer information stored in each counting device to the adjacent order counting device, said means for supplying shifting signals being responsive to carry indications produced by said carry storage means for supplying shifting signals, during a given period of time, to a first counting device until said first counting device produces a carry indication and then to the adjacent order counting device during the remainder of said given period of time.

4. A calculating machine comprising a multiple order counting register, said register comprising a plurality of ordered counting devices, each counting device having minimum and maximum capacity counting states, said register further comprising carry storage means coupled to said counting devices and responsive to a change in any of said counting devices from said maximum capacity state to said minimum state for producing a carry indication, said calculating machine further comprising an electrical pulse signal generator, means for establishing electrical signal paths from said pulse generator to each of said counting devices for successive periods of time, means for controlling the number of electrical pulse signals passed from said pulse generator to each of said counting devices, means coupled to said pulse generator for supplying shifting signals to said counting devices in succession to complement and transfer information stored in each counting device to the adjacent order counting device, said means for supplying shifting signals being adapted to supply shifting signals, simultaneously, to a pair of adjacent order counting devices, with the higher order one of said adjacent devices receiving one less shifting signal than the lower order one, said calculating machine further comprising means for coupling carry indications produced by said lower order device to said means for supplying shifting signals to halt the supply of shifting signals upon the production of such a carry indication.

5. A calculating machine comprising a plurality of ordered pulse-operated counting devices, each device having minimum and maximum capacity counting states, an electronic pulse generator adapted to produce, at a first output terminal, periodic groups of pulses, each group containing a number of pulses equal to the maximum counting capacity of each of said counting devices, first and second gating devices coupled to said first terminal of said pulse generator, means for coupling said first and second gating devices to each of said counting devices in succession for supplying pulses from successive ones of said groups of pulses to said counting devices in descending order, said first and second gating devices being simultaneously coupled to adjacent order counting devices with said first gating device coupled to the lower order one of said adjacent counting devices, a two-state carry storage device having carry and no-carry output terminals and set and unset input terminals, said set input terminal being coupled to all of said counting devices, said carry storage device being responsive to a change in state of any of said counting devices from said maximum to said minimum counting state for producing a carry indication at said carry output terminal, said unset input terminal being coupled to a second terminal of said electronic pulse generator, said pulse generator being arranged to produce, at said second terminal, single unset pulses immediately preceding each of said groups of pulses produced at said first terminal thereof, said calculating machine further comprising means for coupling said no-carry output terminal to said first gating device and said carry output terminal to said second gating device during a shifting operation, means for coupling said no-carry output terminal to both said first and second gating devices during a shift and complement operation, said first gating device being responsive to a no-carry indication by said carry storage device to pass pulses from said groups of pulses and responsive to a carry indication to block passage of said pulses to said counting devices both during a shift operation and a shift and complement operation, said second gating device being responsive to a carry indication to pass pulses during a shift operation and responsive to a no-carry indication to pass pulses during a shift and complement operation.

6. In a calculating machine for performing multiplication and comprising a plurality of pulse-actuated counters, one for each of a plurality of denominational orders, a pulse generator having a plurality of outputs each delivering a distinct number of pulses during one cycle of the pulse generator, a timing device driven by said pulse generator, a two-state carry storage device settable to one state by any of said counters upon appearance in such counter of a specified count and resettable to the opposite state by the generator at the start of each generator cycle, the improvement which comprises means to shift the content of each of said counters to the counter of adjacent higher order, said shift means comprising two gates opened and closed in opposite phases by said device in its set and reset states, means to apply to both of said gates during each of a plurality of generator cycles a number of pulses equal to the number of discriminable states of said counters, and gate means controlled by said timing device for connecting the output of each of said gates to a separate one of two of said counters in a different pair of denominationally adjacent ones of said counters during each of a plurality of cycles of said generator.

7. In a calculating machine for performing division which machine comprises a plurality of pulse-actuated counters, one for each of a plurality of denominational orders, a pulse generator having a plurality of outputs each delivering a distinct number of pulses during one cycle of the pulse generator, a timing device driven by the pulse generator, a two-state carry storage device settable to one state by any of said counters upon appearance therein of a specified count and resettable to the opposite state by the generator at the start of each generator cycle, the improvement which comprises shift and complement means to replace in each of said counters the content of such counter with the complement of the counter of adjacent lower order, said shift and complement means comprising two gates closed and opened in the same phase by said device in its set and reset states respectively, means to apply to both of said gates during each of a plurality of generator cycles as many pulses as there are discriminable states in said counters, means to close said second gate during the first of said pulses, and gate means controlled by said timing device for connecting the outputs of said first and second gates to the lower and higher ordered ones respectively of two denominationally adjacent of said counters in a different pair of denominationally adjacent counters during each of a plurality of cycles of said generator.

References Cited

UNITED STATES PATENTS 2,913,177 11/1959 Petherick ----------- 235—160

FOREIGN PATENTS 239,528 7/1962 Australia.
610,890 10/1960 Italy.

MALCOLM A. MORRISON, *Primary Examiner.*

K. MILDE, J. S. IANDIORIO, V. SIBER, *Assistant Examiners.*